US006363364B1

(12) United States Patent
Nel

(10) Patent No.: US 6,363,364 B1
(45) Date of Patent: Mar. 26, 2002

(54) INTERACTIVE SYSTEM FOR AND METHOD OF PERFORMING FINANCIAL TRANSACTIONS FROM A USER BASE

(76) Inventor: Pierre H. Nel, 502 Tennesse Street, Faerie Glen, Pretoria Gauteng (ZA)

( * ) Notice: Subject to any disclaimer, the term of this patent is extended or adjusted under 35 U.S.C. 154(b) by 0 days.

(21) Appl. No.: 09/048,216

(22) Filed: Mar. 26, 1998

(30) Foreign Application Priority Data

Mar. 26, 1997 (ZA) ................................................ 968078
Aug. 26, 1997 (ZA) ................................................ 977635

(51) Int. Cl.[7] ............................................... G06F 17/60
(52) U.S. Cl. .......................................... 705/42; 705/26
(58) Field of Search ..................................... 705/42, 26

(56) References Cited

U.S. PATENT DOCUMENTS

| 4,763,191 | A | * | 8/1988 | Gordon et al. ................. 358/86 |
| 4,792,849 | A | * | 12/1988 | McCalley et al. | |
| 4,813,912 | A | * | 3/1989 | Chickneas et al. | |
| 5,479,491 | A | * | 12/1995 | Garcia et al. | |
| 5,550,863 | A | * | 8/1996 | Yurt et al. ................... 375/240 |
| 5,574,771 | A | * | 11/1996 | Driessen et al. ............... 379/57 |
| 5,592,470 | A | * | 1/1997 | Rudrapatna et al. | |
| 5,606,361 | A | * | 2/1997 | Davidson et al. .............. 348/14 |
| 5,625,404 | A | * | 4/1997 | Grady et al. | |
| 5,640,453 | A | * | 6/1997 | Schuchman et al. | |
| 5,708,960 | A | * | 1/1998 | Kamisaka et al. | |
| 5,717,452 | A | * | 2/1998 | Janin et al. | |
| 5,748,493 | A | * | 5/1998 | Lightfoot et al. | |
| 5,774,825 | A | * | 6/1998 | Reynolds | |
| 5,794,174 | A | * | 8/1998 | Janky et al. | |
| 5,801,754 | A | * | 9/1998 | Ruybal et al. | |
| 5,805,682 | A | * | 9/1998 | Voit et al. | |
| 5,812,931 | A | * | 9/1998 | Yuen | |
| 5,822,530 | A | * | 10/1998 | Brown | |
| 5,852,610 | A | * | 12/1998 | Olaniyan | |
| 5,877,755 | A | * | 3/1999 | Hellhake | |
| 5,999,624 | A | * | 12/1999 | Hopkins ....................... 380/24 |

FOREIGN PATENT DOCUMENTS

WO    WO 97/05584    *   2/1997

OTHER PUBLICATIONS

C.J. Kraal, Developing for Interactive Service in Digital TV, Broadcasting Convention, international (Conf. Publ. No. 428), Sep. 12–16, pp. 230–235.*
The Authoritative Dictionary of IEEE Standard Terms, Seventh Edition, 2000, p. 121.*
Institute for Telecommunication Sciences, Boulder Colorado, Telecom Glossary 2000, www.its.bldrdoc.gov/fs–1037/dir–005/_0726.htm.*
The Concise Oxford Dictionary of Current English, Ninth Edition, 1995, p. 164.*
Rosman, Janie L. et al. "Computer systems make at–home banking a reality. (Focus: Banking/Finance) (Industry Overview)" published in the Fairfield County Business Journal, Feb. 1, 1993.*
Fickenscher, Lisa. "Online Resources' home banking patent hits hot buttons throughout industry. (Online Resources and Communications Corp., banking industry)" published in American Banker, Feb. 17, 1994.*

* cited by examiner

Primary Examiner—Richard Chilcot
Assistant Examiner—Jennifer I Harle
(74) Attorney, Agent, or Firm—Nixon & Vanderhye P.C.

(57) ABSTRACT

There is disclosed and claimed a system for and a method of performing interactive data exchange, for example as part of a financial transaction, between a user base and a remote network. The system includes a request data input device 20. A telephone network 22 is connected to the device for transmitting the request data to the network 28. At the user base there is also provided a receiver for receiving response signals from the network and which signals include encoded response data. A signal decoder 14 is provided at the user base to decode the response data. A display 12 displays the response data interactively with the request data.

18 Claims, 7 Drawing Sheets

INTERACTIVE SYSTEM FOR AND METHOD OF PERFORMING FINANCIAL TRANSACTIONS FROM A USER BASE

INTRODUCTION AND BACKGROUND

THIS invention relates to a method of and a system for conducting interactive data exchange functions between a user base, typically at home or at an office and a remote computer network.

The data exchange may relate to financial transactions including banking and/or shopping transactions. The known systems and methods for conducting home shopping and home banking transactions suffer from the disadvantage that they are either not fully interactive in real time and/or they do not provide a visual communication interface at the user base, such as the home or office.

OBJECT OF THE INVENTION

Accordingly it is an object of the present invention to provide a method and system with which the applicant believes the aforementioned disadvantages may at least be alleviated.

SUMMARY OF THE INVENTION

According to the invention there is provided a system for performing an interactive data exchange function from a user base, the system including:

input means at the user base for entering request data relating to the function;

means for transmitting the request data to a computer network including one or more of a computer network of at least one financial institution; a computer network of at least one vendor; and a computer network of at least one service provider;

receiver means at the user base for receiving response signals from the network and which signals include encoded response data; and signal decoding and display means at the user base connected to the receiver for decoding the response data and displaying the data in real time and interactively with the request data.

The interactive data exchange function may be a data retrieval action or may form part of a financial transaction. Financial transactions could include banking transactions such as balance requests, funds transfer transactions, electronic account payment transactions and purchase transactions with vendors and/or service providers connected to the network.

The receiver means may include an antenna for receiving signals transmitted from the network via an earth orbiting satellite.

The signal decoding means may form part of a decoder for decoding subscription television broadcast and the display means may be in the form of a screen of a television set connected to the decoder.

The input means may include a telephone instrument; and the means for transmitting the request data may include a telephone network linking the instrument to the computer network.

In another embodiment the decoding means may be in the form of a decoder module forming part of a personal computer connected to the receiver means and the display means may be in the form of a screen of the personal computer.

The input means may include a keyboard connected to the personal computer and the means for transmitting the request data may include a modem connected to the personal computer and to a telephone network connectable to the computer network.

In yet another embodiment the means for transmitting the request data may include a transmitter at the user base connected to an antenna to transmit the request data via an earth orbiting satellite to the computer network.

Also included within the scope of the present invention is a method of performing from a user base station interactive data exchange functions with a network including one or more of a computer network of at least one financial institution; a computer network of at least one vendor; and a computer network of at least one service provider, the method including the steps of:

transmitting from the user base station request data relating to the function;

at the network receiving the request data and generating response data transmitting the response data in encoded form so that it can only be decoded by a decoder designated by the user;

at the base station receiving the encoded data and decoding the data by means of the designated decoder; and displaying the data in real time and interactively with the request data transmitted.

Further according to the method, at least one of the request data and the response signal is transmitted via a telephone network.

In other embodiments at least part of the encoded response data may be transmitted by wireless transmission. More particularly said at least part of the response data may be transmitted via an earth orbiting satellite to the decoder designated by the user.

In some embodiments the request data may be transmitted from the user base to the network via a telephone network. Alternatively the commands may be transmitted from the user base to the network via an earth orbiting satellite.

BRIEF DESCRIPTION OF THE ACCOMPANYING DIAGRAMS

The invention will now further be described, by way of example only, with reference to the accompanying diagrams wherein.

DESCRIPTION OF PREFERRED EMBODIMENTS OF THE INVENTION

Figure 1:
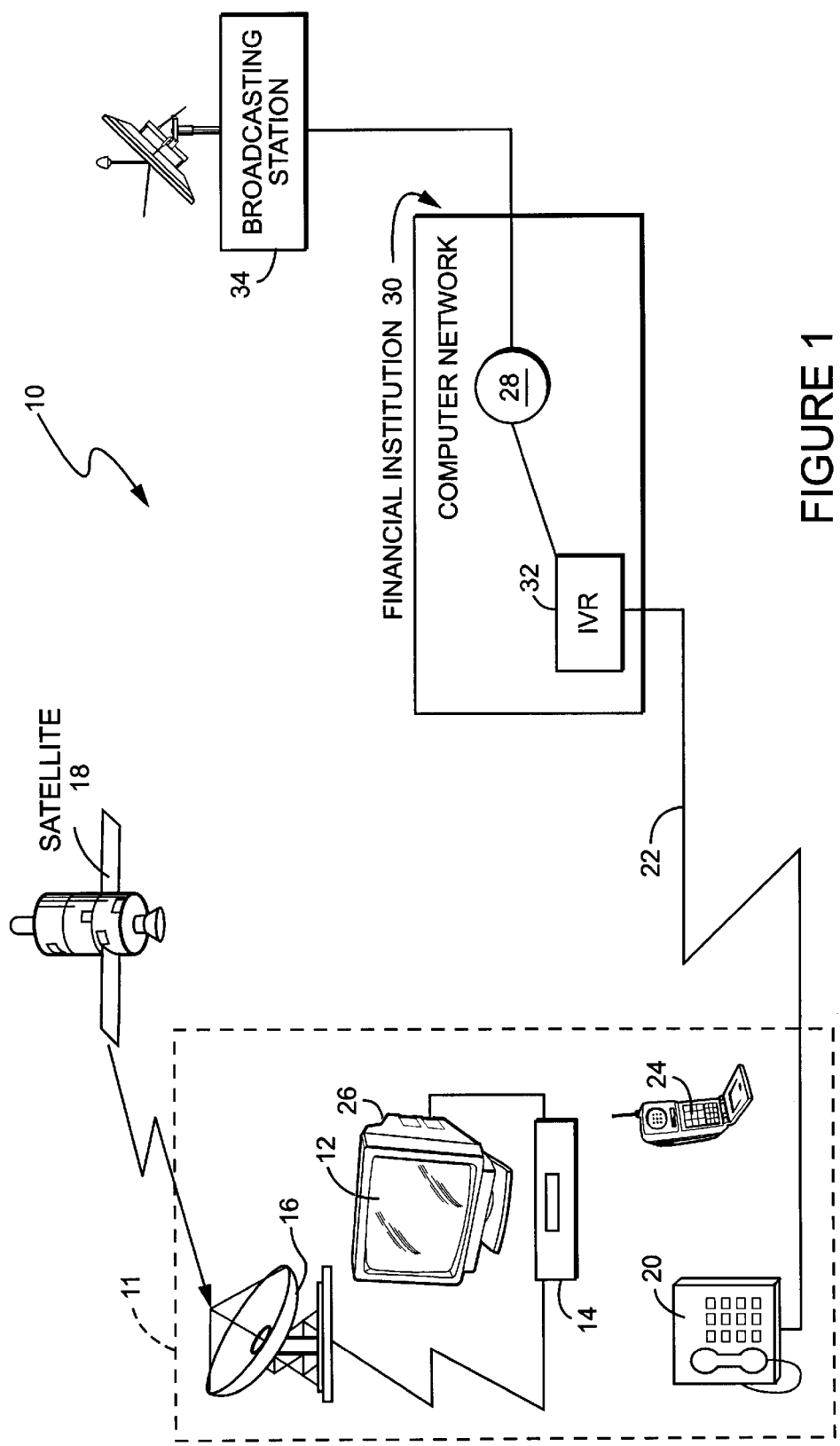
FIG. 1 is a block diagram of a first embodiment of the system according to the invention.

In FIG. 1 there is shown a first embodiment 10 of the system according to the invention for performing an interactive data exchange function, more particularly data exchange relating to financial transactions.

The system 10 includes at a user base 11 (which may be a dwelling or an office), a monitor 12. The monitor is connected to a broadcast signal decoder 14 and the decoder is connected to a dish antenna 16 for receiving signals from an earth orbiting satellite 18. Also provided at the user base is a multi-tone telephone instrument 20 connected to a wired telephone network 22. Furthermore, or alternatively, a cellular phone 24 having access to a cellular network may be provided at the user base.

The monitor 12 may form part of a television set 26. The decoder 14 may be a decoder for decoding subscription television broadcast signals. The antenna 16 is of the kind for receiving these broadcasts.

Also connected to the telephone network 22 is a computer network 28 of a financial institution 30. The network includes an interactive voice response (IVR) frontend 32 connected to the network. The network 28 is further connected to a broadcasting station 34 for transmitting encoded data signals to satellite 18, from where they are forwarded to a footprint, including disk antenna 16.

In use, the user uses tones generated by the telephone instruments to transmit request data relating to messages and instructions via network 22 to computer network 28. The messages and instructions are invited and solicited by IVR frontend 32. For example, the instruction from the user may be in the form of a request to the network 28 to provide the balance of an account of the user with the financial institution. The balance is then provided via the frontend 32, telephone network 22 and at instrument 20 or 24, where it is reproduced in audible form for the user to hear. At the same time encoded data relating to the balance is transmitted to broadcasting station 34. A signal including the data is transmitted to satellite 18. From satellite 18 the signal is forwarded downwardly, where it is received by antenna 16. The encoded data in the signal is decoded by the decoder 14 and displayed on monitor 12 in real time and interactively in response to the aforementioned instruction.

The system includes security mechanisms to ensure that only an authorised user can gain access to information relating to certain accounts. Such measures normally include account numbers and a personal identity number (PIN) transmitted from the instruments 20, 24 to the network 28 via network 22. Similarly, security measures are utilized to ensure that the requested data is only displayed on an authorized monitor 12. These measures may include an identification (ID) code number accompanying the data in the signal and which ID code enables only a designated decoder 14 to decode the encoded data in the signal.

The user may similarly instruct fund transfers between accounts to which he may have access at the financial institution and payment of certain other accounts of third parties. Confirmation of the selected instruction, data requested and account balances are visually displayed in real time on the monitor 12, as hereinbefore described.

Figure 2:
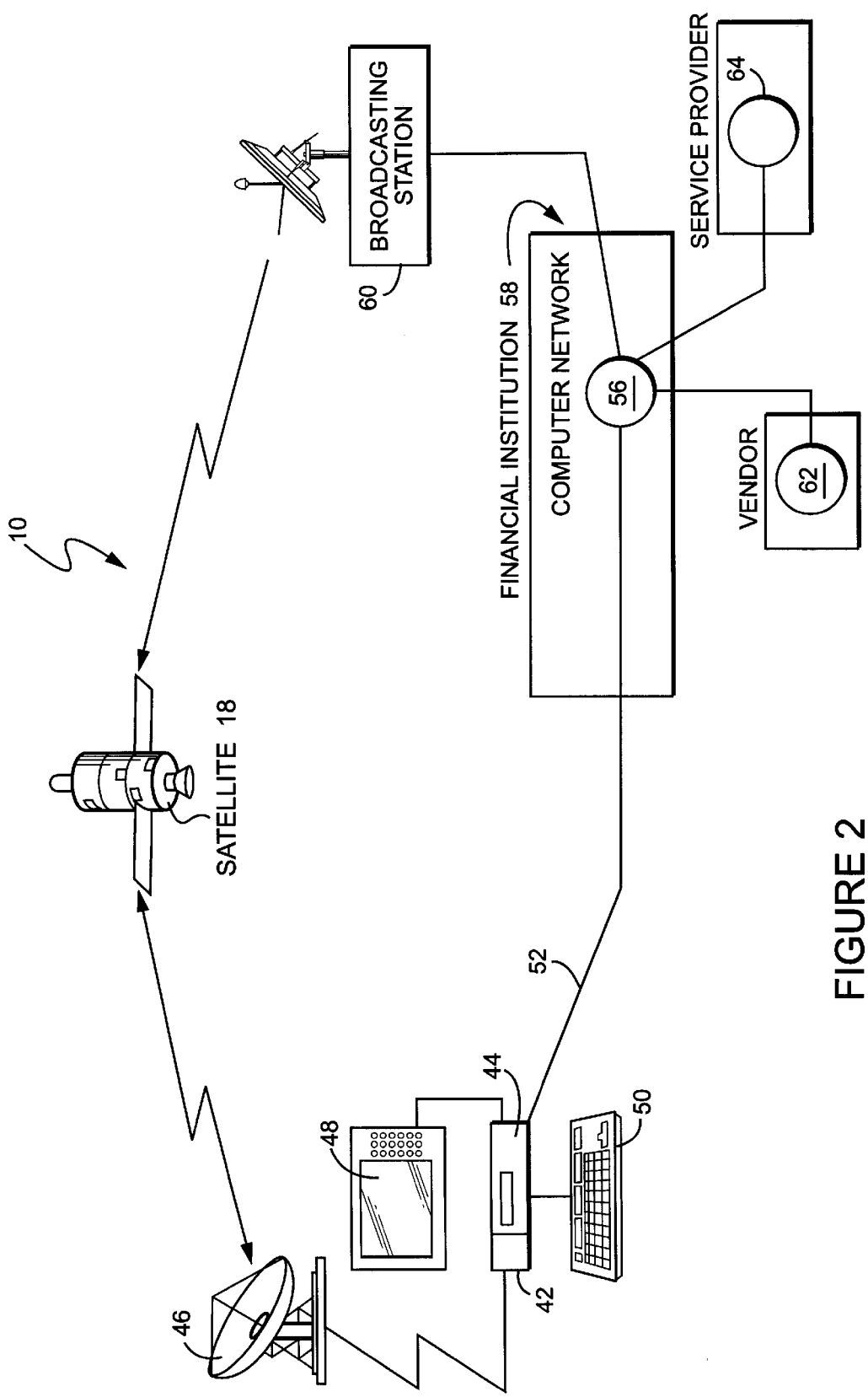
FIG. 2 is a block diagram of a second embodiment of the system according to the invention.

In the second embodiment 40, shown in FIG. 2, the decoder may be in the form of a decoder card 42 in a personal computer PC 44. The decoder card is connected to dish antenna 46. The monitor 48 is a conventional monitor of the personal computer. A keyboard 50 is connected to the computer 44 and the computer is connected via a modem to telephone network 52.

Telephone network 52 is connected to computer network 56 of financial institution 5. The computer network 56 is also connected to broadcasting station 60 as hereinbefore described. The computer networks 62 and 64 of a vendor and a service provider are also connected to computer network 56.

This system also enables interactive communication between the user and the computer network 56 of the financial institution and the networks 62 and 64 of the vendor and the service provider. The user communicates with a selected one of networks 56, 62 and 64 via the keyboard 50, computer 44 and telephone network 52. However, encoded response data is carried by signals transmitted by broadcasting station 60 to satellite 18. The signals are received from the satellite by antenna 46, decoded by decoder 42 and displayed in visible form on monitor 48. Encoded response data may also be carried via telephone network 52 to decoder 42.

Apart from the aforementioned kind of financial transactions described hereinbefore, goods offered by the vendor may be viewed on monitor 48 by the user and ordered in real time via telephone network 52, network 56 and network 62. Payment for the goods may be made as hereinbefore described by a fund transfer transaction initiated by the user via keyboard 50. In a similar manner services may be ordered and paid for.

Figure 3:
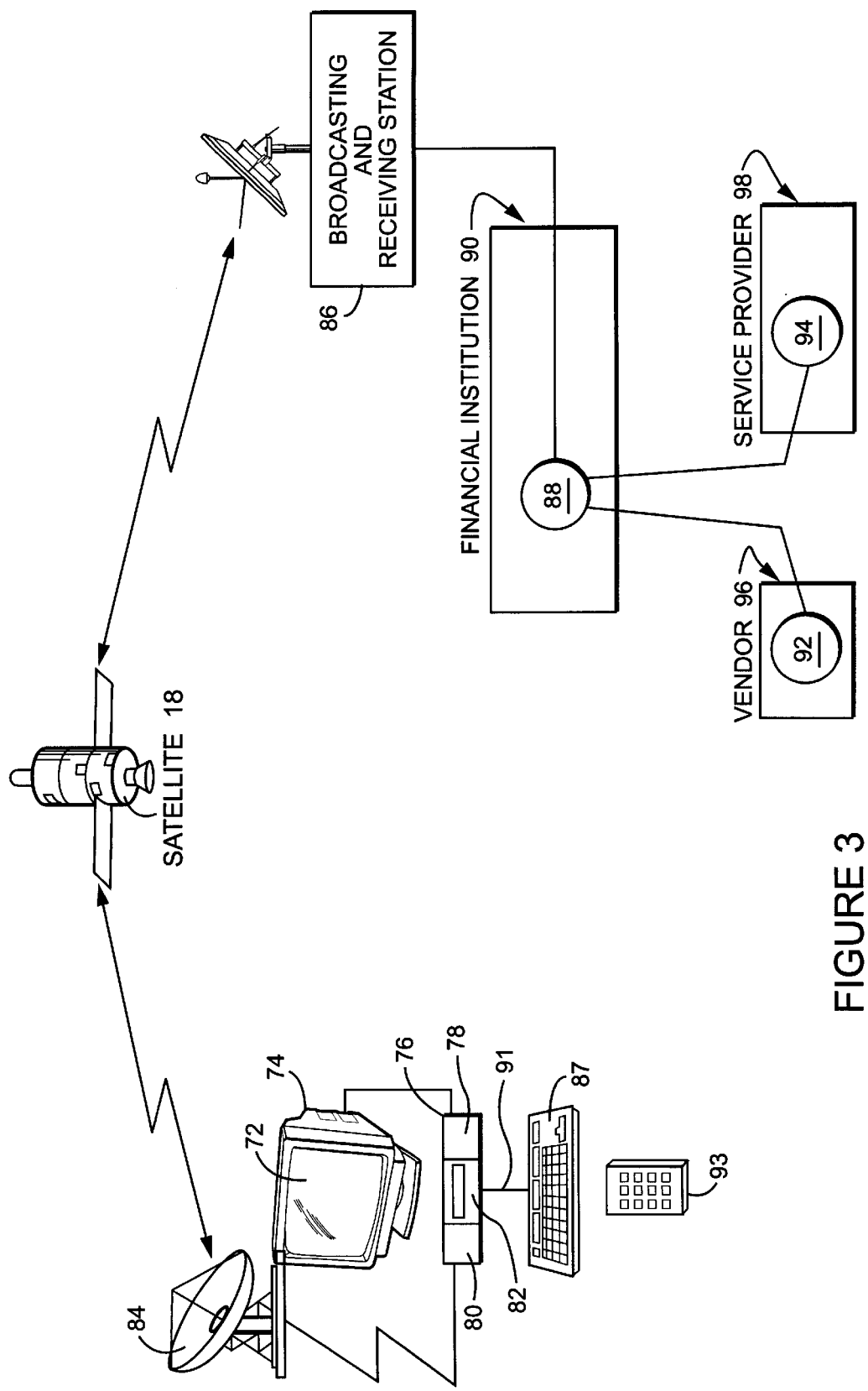
FIG. 3 is a block diagram of a third embodiment of the system according to the invention.

In the third embodiment 70 shown in FIG. 3, the monitor 72 forms part of a television set 74. The decoder 76 forms part of transceiver apparatus 78 including a receiver 80 and a transmitter 82. The transceiver is connected to antenna 84. The decoder is adapted to decode both subscription television broadcast signals and signals received from broadcasting and receiving stations 86. Instructions may be entered into a processor forming part of the transceiver apparatus via keyboard 87 connected by cable 91 to the apparatus or a portable, wireless transmitting unit 93 including a keypad.

The broadcasting and receiving station 86 is connected to a computer network 88 of a financial institution 90. The computer network 88 is also connected to computer networks 92 and 94 of a vendor 96 and a service provider 98.

In use, instruction and request data entered via keyboard 87 or device 93 are carried by signals generated and transmitted by the transmitter 82 forming part of the apparatus 78. The signals are transmitted via antenna 84 to satellite 18 and from satellite 18 to broadcasting and receiving station 86.

The user may request financial transactions as hereinbefore described. Encoded data is carried on signals transmitted to satellite 18 via broadcasting and receiving station 86. The transactions may include financial transactions involving accounts in the financial institution and other institutions connected to the institution 90. It may also include transactions with a selected one of a plurality of vendors connected to the network or a selected one of a plurality of service providers also connected to the network. The response data is caused to be displayed interactively and in real time on monitor 72.

Figure 4:
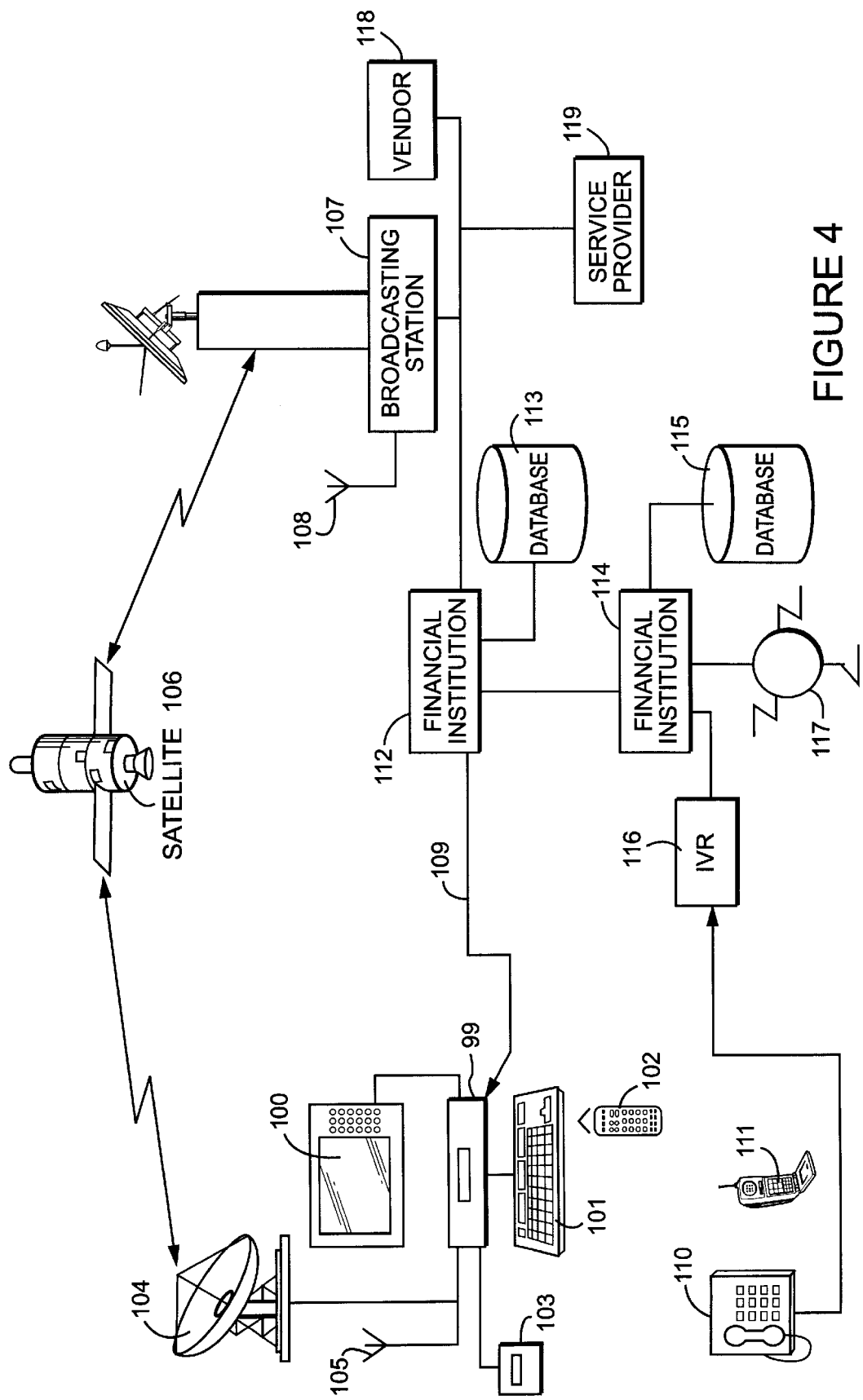
FIG. 4 is a block diagram of the system according to the invention for performing financial data requests or transactions.

In FIG. 4, there is shown an embodiment of the method or system according to the invention for performing financial data requests or transactions.

The computer network has a first financial institution 112 and a second institution 114 with computer based client accounts held within a said first financial institution database 113 and a second financial institution database 115. The system allows users to access and manipulate at least one account held at said financial institution and transfer funds between accounts held by said first financial institution 112 and a second institution 114 by making a desired selection or input on at least one or more of the following input means;

a keypad or keyboard 101, a remote control 102 or a telephone instrument such as a tone 110 or cellular phone 111 that is displayed on display means such as a television screen or computer monitor 100. Selections are communicated to a computer network of a financial institution through the decoder 99 via a telephone network 109 that may include the use of a modem or via RF signals by means of a receiver and transmitter 105 and 108 at user base and at the broadcaster or via bi-directional satellite 106 communication through a satellite dish at user base 104. Alternatively a normal phone 110 or a cellular phone 111 or satellite phone may link to an IVR (Interactive voice response system) 116 which may serve as a front end to communicate user selections or inputs to the computer network of said financial institutions. From the computer network it may be communicated to the decoder via RF 105 and 108, telephone network 109 or satellite broadcast 106 from a broadcasting station 107. Also linked to said computer network is a vendor 118 and a service provider 119. Furthermore a storage device reader and/or writer for example a smart card reader 103 internally to the decoder (not shown) or externally connected via a communications port such as a RS232 port may allow for payment or uploading and downloading of funds onto a smart card of course the first and second financial institution may be the same institution. The second account may be held by a vendor or service provider or third party to allow bill payments or for real time accounting and payment of users selected products of services. Further services include account payments, funds transfers, managing debit orders, account viewing, account management, etc. Also product based financial functions such as shares, mutual funds, futures and the like may be done via the said system. Existing systems or networks or other infrastructures 117 for example ATM (Automated Teller Machines), CAT (Client Activated Terminals), SST (Self Service Terminals) networks may be used to process and execute user request or inputs. The smart card may in conjunction with the PIN be used for user and account identification and the encryption and decryption communicated from the financial institution to the smart card and vice versa. Printing means may be linked to the decoder to allow printing of statements, transactions and accounts via a communication port such as the RS232 port.

Figure 5:
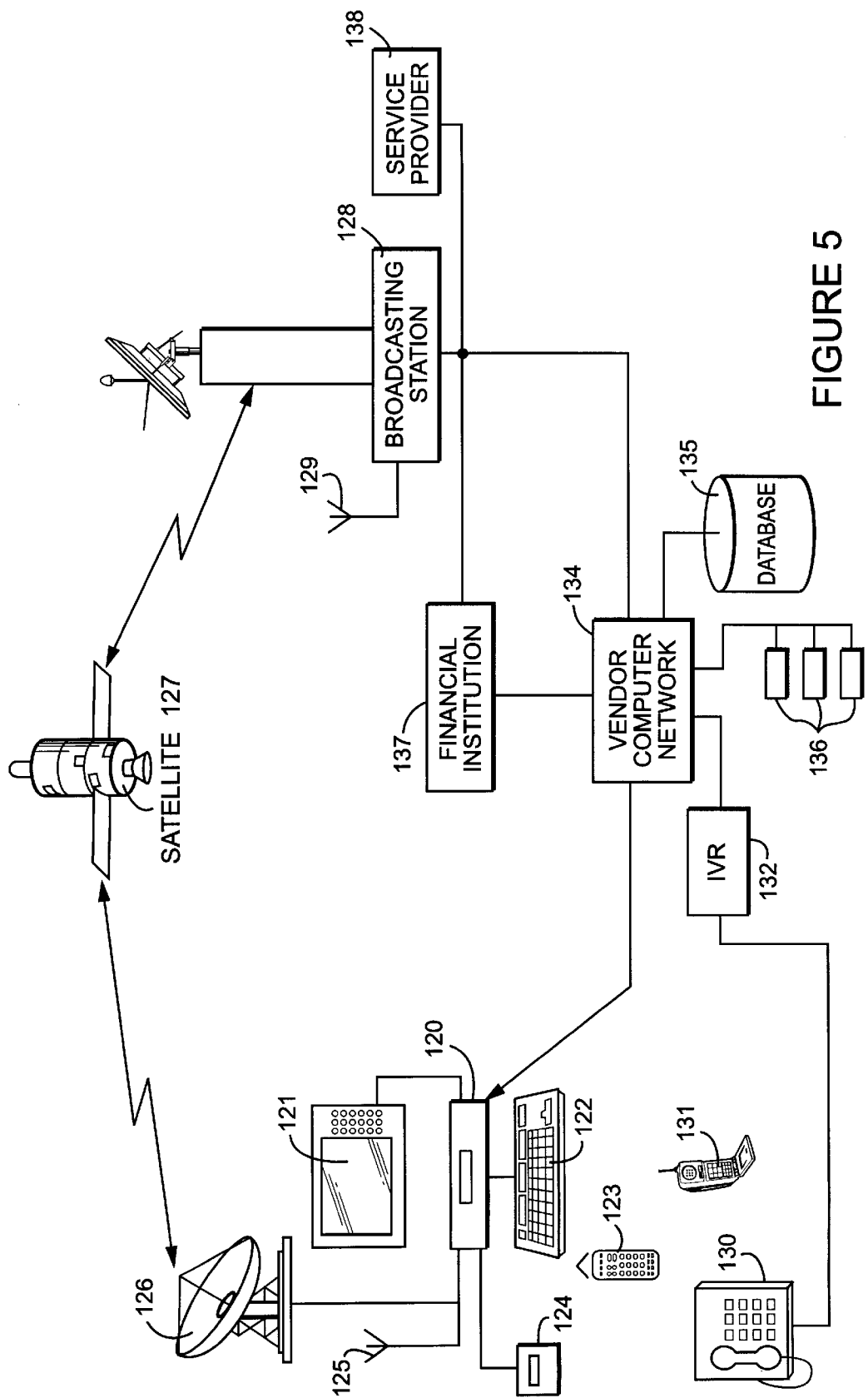
FIG. 5 is a block diagram of a system for performing a commercial transaction or function through a vendor network for accessing a product or service that may be held at a vendor database.

FIG. 5 relates to a method and system for performing a commercial transaction or function through a vendor network for accessing a product or service that may be held at a vendor database.

The computer network has a vendor computer network 134 with at least one database 135 with products and services. The system allows users to access and manipulate at least one vendor product or service 136 held at said vendor network by making a desired selection or input on at least one or more of the following input means; a keypad or keyboard 122, a remote control 123 or a telephone instrument such as a tone 130 or cellular phone 131 that is displayed on display means such as a television screen or computer monitor 121. Selections are communicated to a computer network of a vendor through the decoder 120 via a telephone network that may include the use of a modem or via RF signals by means of a receiver and transmitter 125 and 129 at user base and at the broadcaster or via bi-directional satellite 127 communication through a satellite dish at user base 126. Alternatively a normal phone 130 or a cellular phone 131 or satellite phone may link to an IVR (Interactive voice response system) 132 which may serve as a frontend to communicate user selections or inputs to the computer network of said vendor computer network 134.

From the vendor computer network it may be communicated to the decoder via RF 129 and 125, telephone network or satellite broadcast 127 from a broadcasting station 128. Also linked to said computer network may include a financial institution 137 for example a bank and a service provider 138. Furthermore a storage device reader and/or writer for example a smart card reader 124 internally to the decoder (not shown) or externally connected via a communications port such as a RS232 port may allow for payment or uploading and downloading of funds onto a smart card. Of course the vendor and the financial institution may be the same institution. The second account may be held by a vendor or service provider or third party at the financial institution to allow bill payments or for real time accounting and payment of users selected products of 15; services. The smart card may in conjunction with the PIN be used for user identification and the encryption and decryption communicated from the financial institution or vendor to the smart card and vice versa. Printing means may be linked to the decoder to allow printing of statements, transactions and accounts via a communication port such as the RS232 port. Products may include access to a broadcast channel and a broadcast item, for example a movie or documentary program vendible from the broadcasting station. Other products may include financial products such as shares, mutual funds, futures, insurance, commercial insurance; commercial products such as movie and performance access or tickets, travel related products, mail order catalogues products and gaming products for example betting on race horse and gambling for example casino games. Also software and information such as news and stock market updates may be vended to the user. Payment may be made through the transfer of funds between said financial institutions by transferring funds between user and vendor accounts alternatively payment may be done via smart card through the smart card reader/writer at user base to allow transfer of funds and the downloading and uploading of funds to said smart card to the value of the transaction relating to said product or service.

Figure 6:
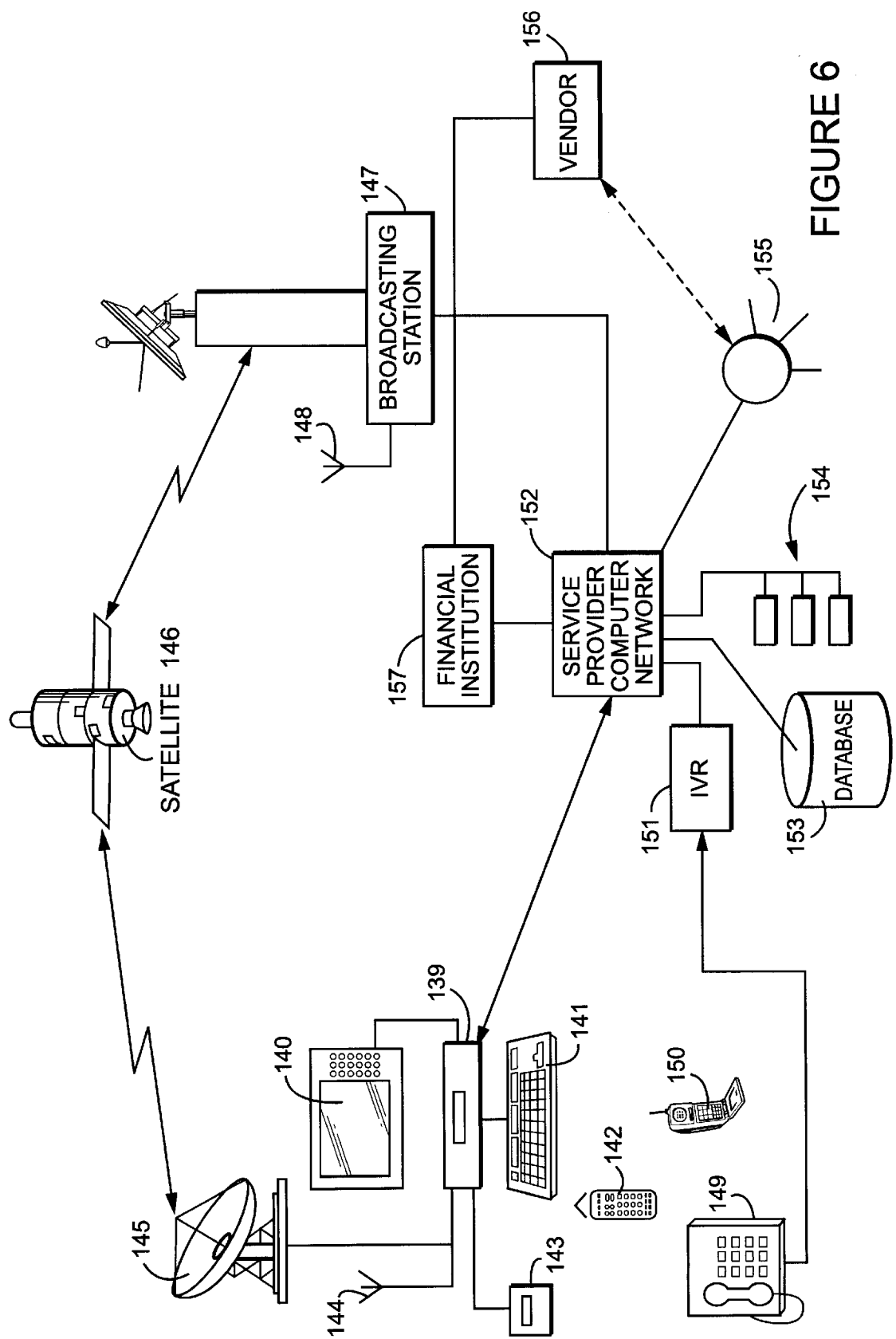
FIG. 6 is a block diagram of a system for performing service provider data requests or interactive information function.

FIG. 6 relates to a method and system for performing a service provider data requests or interactive information function.

The invention has a service provider computer network 152 with at least one database 153 with information and communication products and services 154 such as Internet access an E-mail. The system allows users to access and manipulate at least one information product or service 154 held at said service provider network 152 by making a desired selection or input on at least one or more of the following input means; a keypad or keyboard 141, a remote control 142 or a telephone instrument such as a tone 149 or cellular phone 150 that is displayed on display means such as a television screen or computer monitor 140. Selections are communicated to a computer network of a service provider through the decoder 139 via a telephone network that may include the use of a modem or via RF signals by means of a receiver and transmitter 144 and 148 at user base and at the broadcaster or via bi-directional satellite 146 communication through a satellite dish at user base 145 Alternatively a normal phone 149 or a cellular phone 150 or satellite phone may link to an IVR (Interactive voice response system) 151 which may serve as a front-end to communicate user selections or inputs to the computer network of said service provider computer network 152 From the service provider computer network it may be communicated to the decoder via RF 149 and 144, telephone network or satellite broadcast 146 from a broadcasting station 147. Also linked to said computer network may include a financial institution 157 for example a bank and a vendor 156. Furthermore a storage device reader and/or writer for example a smart card reader 143 internally to the decoder (not shown) or externally connected via a communications port such as a RS232 port may allow for payment or uploading and downloading of funds onto a smart card. Of course the vendor and the financial institution and the service provider may be the same institution. An account may be held by a vendor or service provider or third party at the financial institution to allow bill payments or for real time accounting and payment of users selected service provider products of services. The smart card may in conjunction with the PIN be used for user identification and the encryption and decryption communicated from the financial institution or service provider to the smart card and vice versa. Printing means may be linked to the decoder to allow printing of statements, transactions and accounts via a communication port such as the RS232 port. Service provider services and products may include Internet 155 related services such as access to the World Wide Web, News groups and the sending and receiving of E-mail of a user that may be stored on a database at said service provider network. The Internet 155 may link vendors and financial institutions to the service provider network.

Figure 7:
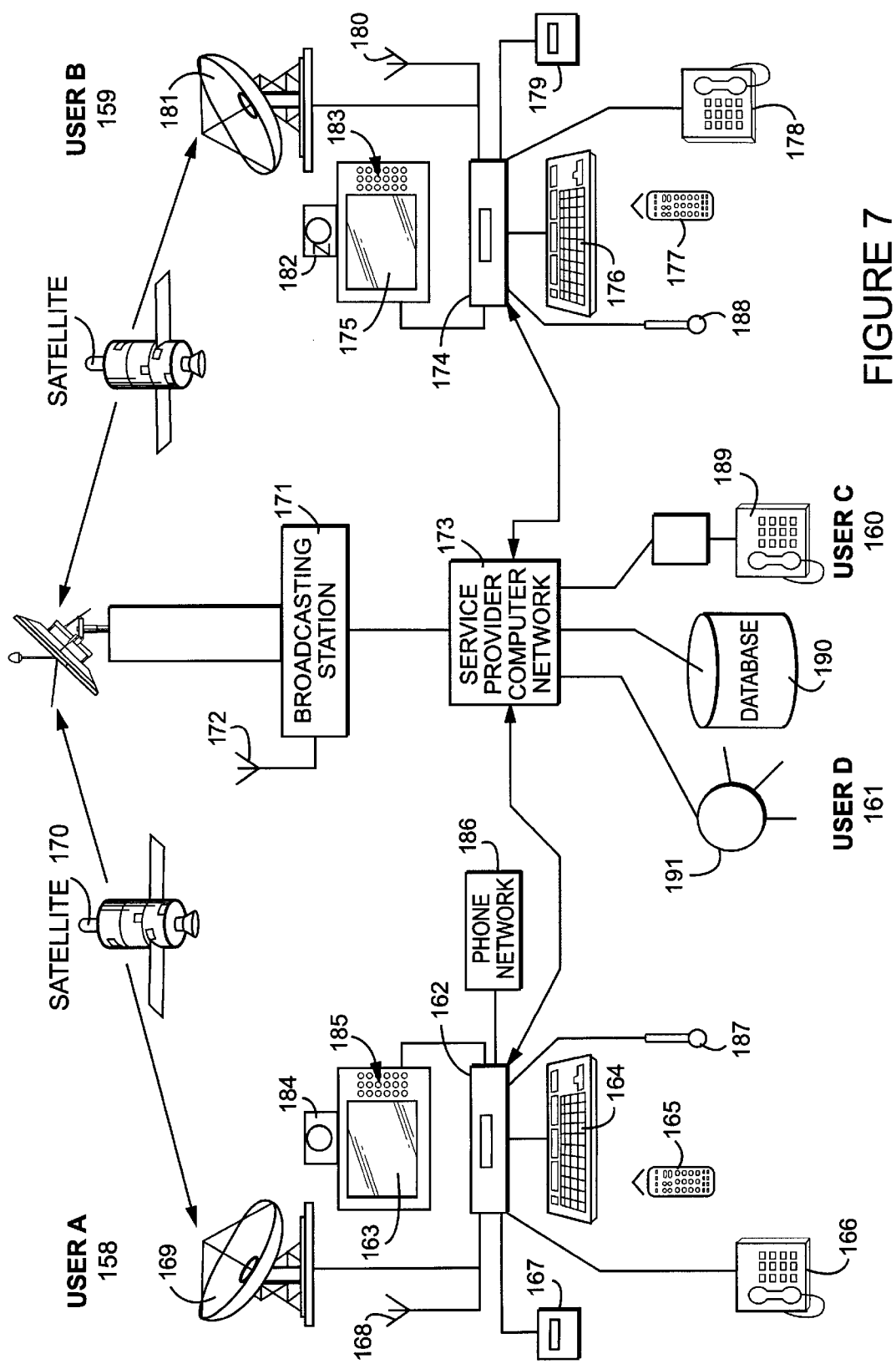
FIG. 7 is a block diagram of a system for performing communication data requests or interactive communication functions.

FIG. 7 relates to a method and system for performing communication data requests or interactive communication functions.

The invention has a service provider computer network 173 with at least one database 190 with information and communication products and services such as on-line education and conferencing. The system allows users to make a telephone call or teleconferencing between similar decoder users 158 and 159 with decoders 162 and 174 or Internet telephone and teleconferencing users 161 or normal telephone network users 160 and communicate at least one communication product or service held at said service provider network 173 by making a desired selection or input on at least one or more of the following input means; a keypad or keyboard 164, 176, a remote control 165, 177 or a telephone instrument such as a phone 166 and 178. The telephones link to the decoders to allow the decoders 162 and 174 to act as interface or mechanism for telephone communication. With teleconferencing an image capturing device 184 and 182 may allow visual data or information to be communicated to users over the network. A microphone 187 and 188 may serve as voice recording interface that allows audio to be communicated to said users and the images is displayed on display means such as a television screen or computer monitor 163 and 175 and audio is reproduced via speakers 183 and 185 or linked speakers to a PC 186. Selections and voice and images are communicated to a computer network of a service provider through the decoder 162 and 174 via a telephone network that may include the use of a modem or via RF signals by means of a receivers and transmitters 168 and 172 and 180 at user base and at the broadcaster 171 or via bi-directional satellite 170 communication through a satellite dish at user base 169 and 181. From the service provider computer network 173 or broadcasting station 171 it may be communicated to the decoders via RF and telephone network or satellite broadcast 170 from a broadcasting station 171. Furthermore a storage device reader and/or writer for example a smart card reader 167 and 179 internally to the decoder (not shown) or externally connected via a communications port such as a RS232 port may allow for payment or uploading and downloading of funds onto a smart card. Of course the vendor and the financial institution and the service provider may be the same institution. An account may be held by a vendor or service provider or third party at the financial institution to allow bill payments or for real time accounting and payment of users selected communication service provider of products of services. The smart card may in conjunction with the PIN be used for user identification and the encryption and decryption communicated from the financial institution or service provider to the smart card and vice versa to allow for payment. Recording means may be linked to the decoder to allow for recording of communication services via a communication port such as the RS232 port. Service provider services and products may include Internet 191 related services such as Internet phoning and teleconferencing and normal phoning from decoder to normal phones on a telephone network 189 and vice versa. The user smart card may serve as ID for directing and controlling communication services.

It will be appreciated that there are many variations in detail on the system and method according to the invention without departing from the scope and spirit of the appended claims.

What is claimed is:

1. A system for performing an interactive data exchange function from a user base, the system including:

a telephone instrument at the user base for entering request data relating to the data exchange function;

a telephone network for transmitting the request data to a computer network including one or more of a computer network of at least one financial institution; a computer network of at least one vendor; and a computer network of at least one service provider;

a receiver at the user base for receiving broadcast response signals broadcasted to many user bases simultaneously from the network and which signals include encoded response data effectively accessible only at the user base; and a signal decoder and display at the user base connected to the receiver, said signal decoder decoding, for access only at the user base, the response data and the display displaying the data in real time and interactively with the request data entered.

2. A system as claimed in claim 1 wherein the receiver include an antenna for receiving signals transmitted from the network via an earth orbiting satellite.

3. A system as claimed in claim 1 wherein the signal decoder decodes subscription television broadcasts and wherein the display comprises a screen of a television set connected to the decoder.

4. A system as claimed in claim 1 wherein the decoder comprises a module forming part of a personal computer connected to the receiver and wherein the display comprises a screen of the personal computer.

5. A system as claimed in claim 1 further including a transmitter at the user base connected to an antenna to transmit the request data via an earth orbiting satellite to the computer network.

6. A method of performing from a user base station interactive data exchange functions with a network including one or more of: a computer network of at least one financial institution; a computer network of at least one vendor; and a computer network of at least one service provider, the method including the steps of:

(a) transmitting from the user base station request data relating to the interactive data exchange function;

(b) receiving the request data at the network and generating response data to the request data;

(c) broadcasting the response data to many user base stations simultaneously in encoded form so that it can only be decoded by a decoder designated by the user;

(d) receiving the broadcasted encoded response data at the user base station, and decoding the data using the designated decoder; and (e) presenting the data in real time and interactively with the request data transmitted.

7. A system for performing an interactive data exchange function from a user base, the system including:

an input arrangement at the user base for entering request data relating to the data exchange function;

a transmitter coupled to the input arrangement, the transmitter transmitting the request data to a computer network including one or more of a computer network of at least one financial institution; a computer network of at least one vendor; and a computer network of at least one service provider;

a receiver receiving broadcast response signals broadcasted to many receivers simultaneously from the network and which signals include encrypted response data; and a signal decryptor connected to the receive for decrypting the response data and presenting the response data in real time and interactively with the request data entered.

8. A system as claimed in claim 1 wherein said computer network includes all of a computer network for at least one financial institution, at least one vendor, and at least one service provider.

9. A method as claimed in claim 6 wherein step (b) is practiced by receiving the request data at each of at least one financial institution, at least one vendor, and at least one service provider.

10. A method as claimed in claim 6 wherein step (c) is practiced at least in part by broadcasting via an earth orbiting satellite.

11. A method as claimed in claim 9 wherein step (a) is practiced at least in part by transmitting the request data to the network via an earth orbiting satellite.

12. A system as claimed in claim 7 wherein said computer network includes all of a computer network for at least one financial institution, at least one vendor, and at least one service provider.

13. A system as claimed in claim 3 wherein said computer network includes all of a computer network for at least one financial institution, at least one vendor, and at least one service provider.

14. The system of claim 7 wherein the receiver receives encrypted response data broadcast to many users simultaneously.

15. A system for performing an interactive data exchange function from a user base, the system including:

a mobile telephone instrument at the user base for entering request data relating to the function, a mobile telephone network for transmitting the request data to a computer network including one or more of a computer network of at least one financial institution, a computer network of at least one vendor, and a computer network of at least one service provider;

a receiver at/in the mobile telephone instrument for receiving broadcast response signals broadcasted to many receivers simultaneously from the network and which signals include encoded response data and intended for access by the mobile phone, a signal decoder and a display at/in the mobile phone connected to the receiver for decoding the response data and displaying the data in real time and interactively with the request data entered.

16. The system of claim 14 wherein the display is disposed on the mobile telephone instrument.

17. A method of performing from a mobile telephone instrument interactive data exchange functions with a network including one or more of:

a computer network of at least one financial institution, a computer network of at least one vendor; and a computer network of at least one service provider, the method including the steps of:

transmitting from the mobile telephone instrument request data relating to the function;

at the network receiving the request data and generating response data;

broadcasting the response data to many mobile telephone instruments simultaneously in an encoded form so that it can only be decoded by a decoder of the mobile instrument from where the request data was transmitted;

receiving the encoded data and decoding the data by means of the mobile telephone instrument; and displaying the data in real time and interactively with the request data transmitted.

18. The method of claim 17 wherein the displaying step is preformed via display means of the mobile telephone instrument.

* * * * *